US008607451B2

(12) United States Patent
Arase et al.

(10) Patent No.: US 8,607,451 B2
(45) Date of Patent: Dec. 17, 2013

(54) COMBUSTOR-TRANSITION-PIECE GUIDE JIG AND METHOD OF DETACHING AND ATTACHING COMBUSTOR OF GAS TURBINE

(75) Inventors: Kenichi Arase, Hyogo-ken (JP); Sosuke Nakamura, Hyogo-ken (JP); Norihiko Motoyama, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 524 days.

(21) Appl. No.: 12/919,051

(22) PCT Filed: Jan. 26, 2009

(86) PCT No.: PCT/JP2009/051225

§ 371 (c)(1), (2), (4) Date: Aug. 24, 2010

(87) PCT Pub. No.: WO2009/119149

PCT Pub. Date: Oct. 1, 2009

(65) Prior Publication Data

US 2011/0000080 A1 Jan. 6, 2011

(30) Foreign Application Priority Data

Mar. 28, 2008 (JP) ................................ 2008-088747

(51) Int. Cl.
*B25B 27/14* (2006.01)
*B23Q 1/00* (2006.01)
*B23P 6/00* (2006.01)

(52) U.S. Cl.
USPC .......... 29/889.1; 269/47; 29/281.1; 29/426.1; 29/464

(58) Field of Classification Search
USPC ......... 269/289 R–314, 47–52; 29/281.1, 467, 29/721, 559, 889.1, 426.1, 464; 60/752
See application file for complete search history.

(56) References Cited

U.S. PATENT DOCUMENTS 4,413,470 A * 11/1983 Scheihing et al. .............. 60/800
5,911,680 A 6/1999 Takeoka
5,921,075 A 7/1999 Shimoyama et al.

(Continued)

FOREIGN PATENT DOCUMENTS

EP 2236939 A1 * 10/2010
GB 2177160 A * 1/1987

(Continued)

OTHER PUBLICATIONS

ISR for PCT/JP2009/051225 mailed Mar. 10, 2009.

(Continued)

*Primary Examiner* — David Bryant
*Assistant Examiner* — Jacob Cigna
(74) *Attorney, Agent, or Firm* — Lowe, Hauptman & Ham

(57) ABSTRACT

A combustor-transition-piece guide jig is constituted by two rails, a fixing member, and a holding member. The fixing member is provided at one ends of the rails and attached to a combustor attachment port. The rails are inserted from the combustor attachment port toward inside of the combustor casing and fixed to the combustor attachment port by the fixing member. The rails come into contact with a combustor-transition-piece guiding part provided on a combustor transition piece to guide a movement of the combustor transition piece in one direction.

8 Claims, 12 Drawing Sheets

(56) References Cited

U.S. PATENT DOCUMENTS

| | | | | |
|---|---|---|---|---|
| 6,141,862 | A | 11/2000 | Matsui et al. | |
| 7,197,803 | B2 * | 4/2007 | Kemsley et al. | 29/407.05 |
| 2010/0038835 | A1 * | 2/2010 | Horiuchi et al. | 269/47 |
| 2012/0159955 | A1 * | 6/2012 | Shiotani et al. | 60/752 |

FOREIGN PATENT DOCUMENTS

| | | | | |
|---|---|---|---|---|
| JP | 62168932 | A | * | 7/1987 |
| JP | 08-200682 | A | | 8/1996 |
| JP | 08-210642 | A | | 8/1996 |
| JP | 08210642 | A | * | 8/1996 |
| JP | 09-079577 | A | | 3/1997 |
| JP | 09-108961 | A | | 4/1997 |
| JP | 09-168931 | A | | 6/1997 |
| JP | 09-210361 | A | | 8/1997 |
| JP | 10-196959 | A | | 7/1998 |
| JP | 10194665 | A | * | 7/1998 |
| JP | 10-231737 | A | | 9/1998 |

OTHER PUBLICATIONS

Notice of Allowance corresponding to KR 10-2010-7020049, dated Sep. 28, 2012.

* cited by examiner

COMBUSTOR-TRANSITION-PIECE GUIDE JIG AND METHOD OF DETACHING AND ATTACHING COMBUSTOR OF GAS TURBINE

RELATED APPLICATIONS

The present application is based on International Application Number PCT/JP2009/051225, filed Jan. 26, 2009, and claims priority from, Japanese Application Number 2008-088747, filed Mar. 28, 2008, the disclosures of which are hereby incorporated by reference herein in their entirety.

TECHNICAL FIELD

The present invention relates to detachment or attachment of a combustor of a gas turbine from or to the gas turbine.

BACKGROUND ART

A gas turbine is constituted by a compressor, a combustor, and a turbine. Periodic inspections are required for the gas turbine to demonstrate its stable performance. Further, when parts constituting the combustor are consumed due to operations of the gas turbine, replacement and maintenance are required. Because the combustor is large in mass, the load on workers at the time of inspection increases. Further, the time required for the inspection becomes long. If a long time is required for the inspection, its operation time decreases, and therefore there is a demand to finish the inspection as quickly as possible. Accordingly, as for cases when the combustor is detached from the gas turbine for inspections and maintenance, for example, there are disclosed techniques for detaching and attaching a combustor from and to a gas turbine by using a combustor exchanger in Patent Documents 1 to 5.

Patent Document 1: Japanese Patent Application Laid-open No. H9-168931

Patent Document 2: Japanese Patent Application Laid-open No. H9-210361

Patent Document 3: Japanese Patent Application Laid-open No. H9-108961

Patent Document 4: Japanese Patent Application Laid-open No. H10-196959

Patent Document 5: Japanese Patent Application Laid-open No. H9-79577

DISCLOSURE OF INVENTION

Problem to be Solved by the Invention

The techniques disclosed in Patent Documents 1 to 3 use a combustor exchanger, and thus a device required for detaching and attaching the combustor becomes complicated and large, thereby increasing the cost for introducing such a device. Therefore, there has been desired a method that can realize detachment and attachment of a combustor with a simple configuration, while reducing the load on workers. The present invention has been achieved to solve the above circumstances, and an object of the present invention is to reduce the load on workers due to a simple configuration at least at the time of detaching a combustor of a gas turbine from the gas turbine or at the time of attaching the combustor of the gas turbine to the gas turbine.

Means for Solving Problem

According to an aspect of the present invention, a combustor-transition-piece guide jig to be used at a time of attaching to the gas turbine or detaching from the gas turbine a combustor including a nozzle block that burns fuel together with air to generate combustion gas and a combustor transition piece that connects the nozzle block with a turbine of a gas turbine to guide the combustion gas to the turbine, includes: a rail that is inserted from a combustor attachment port formed in a combustor casing of the gas turbine for attaching the combustor toward inside of the combustor casing, comes into contact with a combustor-transition-piece guiding part provided on the combustor transition piece, and guides the combustor transition piece; and a fixing member that is provided at one end of the rail, is attached to the combustor attachment port, and fixes the rail to the combustor attachment port.

In this way, by supporting the combustor-transition-piece guiding part provided on the combustor transition piece by the rail attached to the combustor casing, a large-scale exchanging facility is not required at the time of detaching or attaching the combustor from or to the gas turbine. Because the combustor transition piece is supported by the rail via the combustor-transition-piece guiding part, a force at the time of moving the combustor transition piece from the combustor casing or at the time of moving the combustor transition piece to the combustor casing is reduced. The rail reaches inside of the combustor casing, and thus the combustor transition piece can be moved stably. As a result, the load on workers can be reduced due to a simple configuration, at least at the time of detaching the combustor of the gas turbine from the gas turbine or at the time of attaching the combustor of the gas turbine to the gas turbine.

Advantageously, in the combustor-transition-piece guide jig, the rail is parallel with a penetration direction of the combustor attachment port. Accordingly, if the size of an external shape of the combustor transition piece is the same, an opening of the combustor attachment port can be requisite minimum. Therefore, the combustor attachment port does not need to be enlarged more than necessary, and the strength of a casing constituting the combustor casing can be easily ensured.

According to another aspect of the present invention, a method of detaching a combustor of a gas turbine, at a time of detaching a combustor that includes a nozzle block that burns fuel together with air to generate combustion gas and a combustor transition piece that connects the nozzle block with a turbine of a gas turbine to guide the combustion gas to the turbine, and is attached to a combustor casing of the gas turbine, includes: a step of detaching the nozzle block from the combustor casing; a step of inserting a combustor-transition-piece guide jig for guiding the combustor transition piece from a combustor attachment port formed in the combustor casing for attaching the combustor toward inside of the combustor casing; a step of attaching the combustor-transition-piece guide jig to the combustor attachment port; and a step of extracting the combustor transition piece from the combustor attachment port, while causing a combustor-transition-piece guiding part provided on the combustor transition piece to engage with the combustor-transition-piece guide jig to move along the combustor-transition-piece guide jig.

In this way, by supporting the combustor-transition-piece guiding part provided on the combustor transition piece by the rail attached to the combustor casing, a large-scale exchanging facility is not required at the time of detaching the combustor from the gas turbine. Because the combustor transition piece is supported by the rail via the combustor-transition-piece guiding part, and movement thereof is guided in one direction (a longitudinal direction of the rail), a force at the time of detaching the combustor transition piece from the combustor casing is reduced. As a result, at the time of detaching the combustor of the gas turbine from the gas turbine, the load on workers can be reduced due to a simple configuration.

According to still another aspect of the present invention, a method of attaching a combustor of a gas turbine, at a time of attaching a combustor including a nozzle block that burns fuel together with air to generate combustion gas and a combustor transition piece that connects the nozzle block with a turbine of a gas turbine to guide the combustion gas to the turbine to the gas turbine, includes: a step of bringing a combustor-transition-piece guiding part provided on the combustor transition piece to engage with the combustor-transition-piece guide jig into contact with a combustor-transition-piece guide jig that guides the combustor transition piece, which is attached to a combustor attachment port formed in a combustor casing of the gas turbine for attaching the combustor; a step of carrying the combustor transition piece from the combustor attachment port to inside of the combustor casing, while moving the combustor-transition-piece guiding part along the combustor-transition-piece guide jig; a step of detaching the combustor-transition-piece guide jig from the combustor attachment port; and a step of attaching the nozzle block to the combustor attachment port.

In this way, by supporting the combustor-transition-piece guiding part provided on the combustor transition piece by the rail attached to the combustor casing, a large-scale exchanging facility is not required at the time of attaching the combustor to the gas turbine. Because the combustor transition piece is supported by the rail via the combustor-transition-piece guiding part, a force at the time of moving the combustor transition piece toward the combustor casing is reduced. As a result, at the time of attaching the combustor of the gas turbine to the gas turbine, the load on workers can be reduced due to a simple configuration.

Effect of the Invention

According to the present invention, at least at the time of detaching the combustor of the gas turbine from the gas turbine or at the time of attaching the combustor of the gas turbine to the gas turbine, the load on workers can be reduced due to a simple configuration.

EXPLANATIONS OF LETTERS OR NUMERALS

Figure 1:
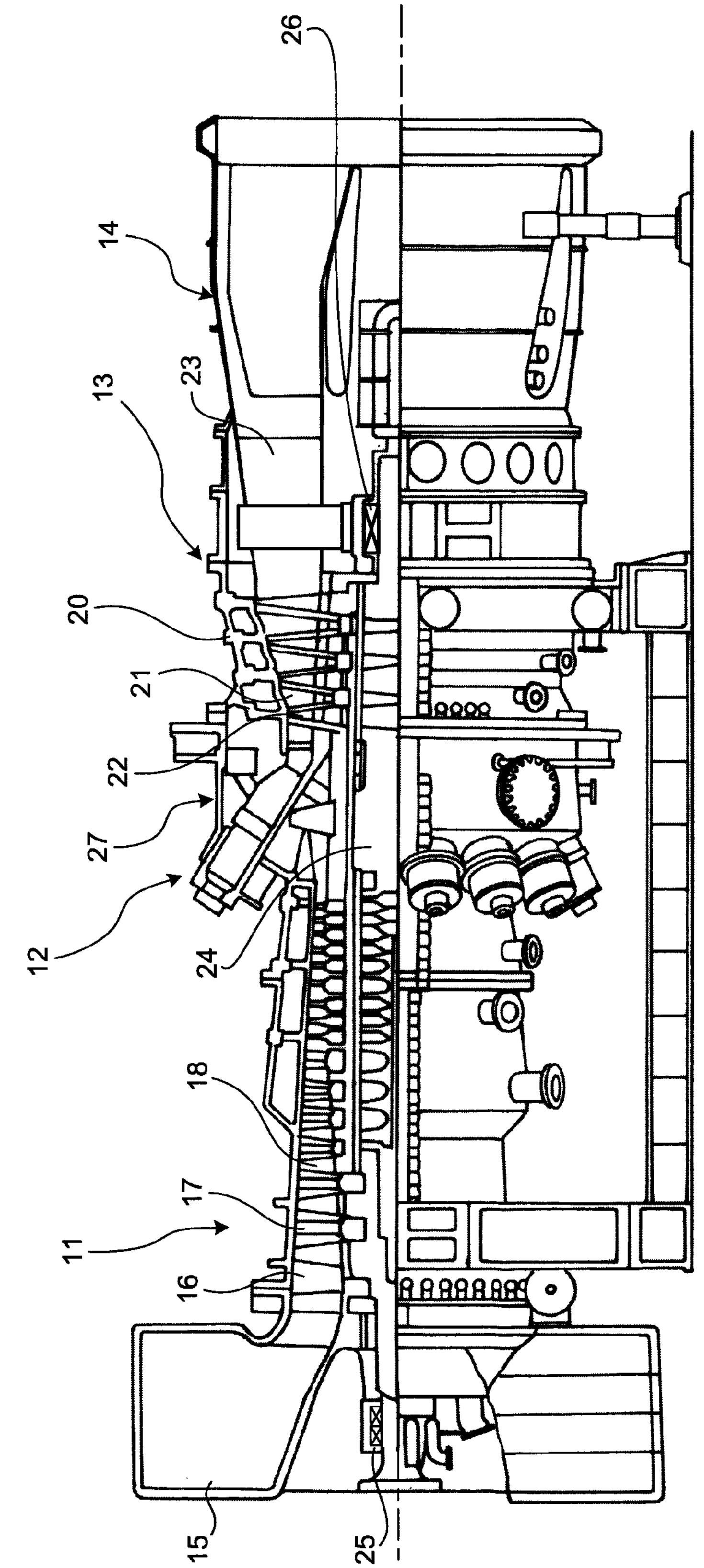
FIG. 1 is a schematic diagram of a gas turbine, to which a method of attaching and detaching a combustor of a gas turbine according to an embodiment of the present invention can be applied.

1 gas turbine
11 compressor
12 combustor
13 turbine
14 exhaust chamber
16 compressor casing
20 turbine casing
24 rotor
25, 26 bearing
27 combustor casing
27F combustor casing flange
27I inside of combustor casing (inside)
28, 28*a* combustor attachment port
30 nozzle block
31 combustor outer casing
32 combustor inner cylinder
33 combustor transition piece
34 pilot nozzle
35 premix nozzle
40 combustor-transition-piece guiding part
41 guide jig support
50 combustor-transition-piece guide jig

51, 52 rail
53 fixing member
54 holding member
56 combustor-casing side support

BEST MODE(S) FOR CARRYING OUT THE INVENTION

Exemplary embodiments of the present invention will be explained below in detail with reference to the accompanying drawings. The present invention is not limited to the following descriptions. In addition, constituent elements in the following descriptions include those that can be easily assumed by those skilled in the art or that are substantially equivalent.

Embodiment

Figure 2:
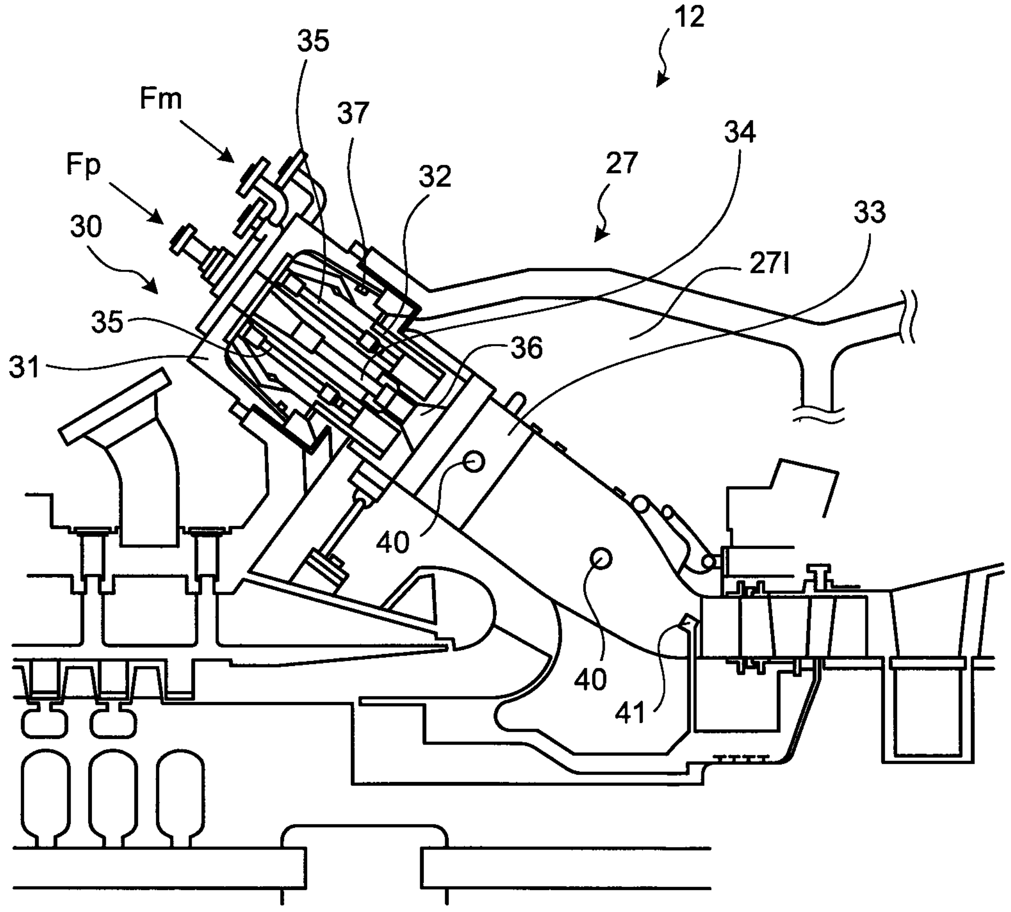
FIG. 2 is a schematic diagram of a combustor and a combustor casing of the gas turbine shown in FIG. 1.

FIG. 1 is a schematic diagram of a gas turbine, to which a method of attaching and detaching a combustor of a gas turbine according to an embodiment of the present invention can be applied. FIG. 2 is a schematic diagram of the combustor and a combustor casing of the gas turbine shown in FIG. 1. A gas turbine 1 shown in FIG. 1 includes a compressor 11, a combustor (a gas turbine combustor) 12, a turbine 13, and an exhaust chamber 14. For example, a power generator is connected to the turbine 13, and the gas turbine 1 drives the power generator to generate power.

The compressor 11 includes an air inlet 15 that takes in air, and a row of compressor vanes 17 and a row of compressor rotor blades 18 are alternatively arranged in a compressor casing 16. The combustor 12 is attached to a combustor casing 27 to supply fuel to compressed air compressed by the compressor 11, and the fuel is ignited by a burner and burned. In the turbine 13, a row of turbine nozzles 21 and a row of turbine rotor blades 22 are alternatively arranged in a turbine casing 20.

The exhaust chamber 14 includes an exhaust diffuser 23 continuous to the turbine 13. A rotor (a turbine shaft) 24 is arranged to penetrate a central part of the compressor 11, the combustor 12, the turbine 13, and the exhaust chamber 14, and an end thereof on the compressor 11 side is rotatably supported by a bearing 25, with an end on the exhaust chamber 14 side being rotatably supported by a bearing 26. A plurality of disk plates are fixed to the rotor 24, and the row of compressor rotor blades 18 and the row of turbine rotor blades 22 are connected to the rotor 24. A drive shaft of the power generator is connected to the end of the rotor 24 on the exhaust chamber 14 side.

The air taken in from the air inlet 15 of the compressor 11 passes through the row of compressor vanes 17 and the row of compressor rotor blades 18 and is compressed, to become high-temperature and high-pressure compressed air. In the combustor 12, the fuel supplied to the compressed air generated by the compressor 11 burns. High-temperature and high-pressure combustion gas, which is a working fluid generated by the combustor 12, drives and rotates the rotor 24 in a process of passing through the row of turbine nozzles 21 and the row of turbine rotor blades 22 constituting the turbine 13. With this configuration, the power generator connected to the rotor 24 is driven to generate power, while flue gas passes through the exhaust diffuser 23 in the exhaust chamber 14 and is released into the atmosphere.

As shown in FIG. 2, the combustor 12 is constituted by connecting a combustor transition piece 33 to a nozzle block 30, and the combustor 12 is attached to the combustor casing 27. The nozzle block 30 includes a combustor outer casing 31, a combustor inner cylinder 32, a pilot nozzle 34, a premix nozzle 35, and a top hat nozzle 37.

The combustor inner cylinder 32 is supported with a predetermined gap in the combustor outer casing 31 constituting the nozzle block 30, and the combustor transition piece 33 is connected to an end of the combustor inner cylinder 32. The pilot nozzle 34 is arranged in a central part of inside of the combustor inner cylinder 32, and a plurality of main fuel nozzles (the premix nozzles) 35 are arranged along a circumferential direction on an inner circumference of the combustor inner cylinder 32 to surround the pilot nozzle 34. A pilot cone 36 is attached to an end of the pilot nozzle 34. A plurality of top hat nozzles 37 are provided along a circumferential direction on an inner circumference of the combustor outer casing 31.

The pilot nozzle 34 burns fuel, more specifically, pilot fuel Fp together with air to generate combustion gas, and supplies the combustion gas to the turbine 13 shown in FIG. 1. The premix nozzle 35 burns fuel, more specifically, main fuel Fm together with air to generate combustion gas, and supplies the combustion gas to the turbine 13 shown in FIG. 1.

The combustor transition piece 33 is a cylindrical structure, and is arranged in inside 27I of the combustor casing 27 (inside of the combustor casing). A combustor-transition-piece guiding part 40 used at the time of attaching the combustor transition piece 33 to the combustor casing 27 or detaching the combustor transition piece 33 from the combustor casing 27 is provided on an outer circumference of the combustor transition piece 33. A guide jig support 41 that supports a combustor-transition-piece guide jig used at the time of attaching the combustor transition piece 33 to the gas turbine 1 shown in FIG. 1 (more specifically, to the combustor casing 27) or detaching the combustor transition piece 33 from the gas turbine 1 (more specifically, from the combustor casing 27) is provided in the inside 27I of the combustor casing. Hereinafter, detaching the combustor transition piece 33 from the gas turbine 1 and detaching the combustor transition piece 33 from the combustor casing 27 are referred to as the same meaning. Further, attaching the combustor transition piece 33 to the gas turbine 1 and attaching the combustor transition piece 33 to the combustor casing 27 are referred to as the same meaning.

Figure 3:
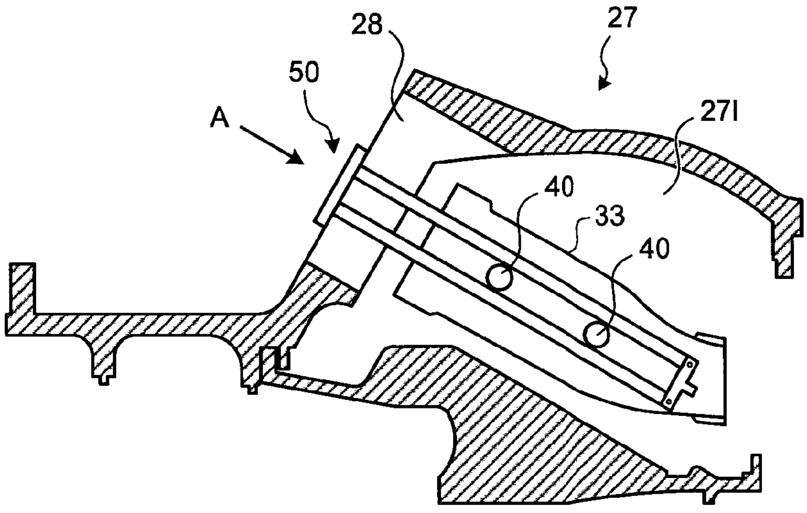
FIG. 3 depicts a relation between a combustor-transition-piece guide jig and a combustor transition piece according to the embodiment.
Figure 4:
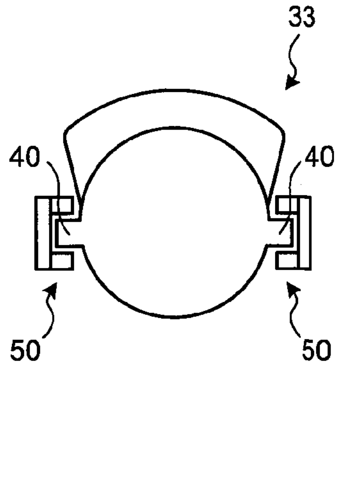
FIG. 4 depicts a combustor transition piece inside of a combustor casing, as viewed from a direction of an arrow A in FIG. 3.

FIG. 3 depicts a relation between the combustor-transition-piece guide jig and the combustor transition piece according to the present embodiment. FIG. 4 depicts the combustor transition piece inside of the combustor casing, as viewed from a direction of an arrow A in FIG. 3. As shown in FIGS. 3 and 4, when the combustor transition piece 33 in the inside 27I of the combustor casing is detached from the combustor casing 27 (that is, detached from the gas turbine 1 in FIG. 1), or when the combustor transition piece 33 is attached to the combustor casing 27 (that is, attached to the gas turbine 1 in FIG. 1), the combustor transition piece 33 is guided by using a combustor-transition-piece guide jig 50 according to the present embodiment. As shown in FIG. 3, the combustor-transition-piece guide jig 50 is attached to a combustor attachment port 28. At the time of detaching or attaching the combustor transition piece 33, the combustor-transition-piece guiding part 40 provided on the outer circumference of the combustor transition piece 33 is supported to support the combustor transition piece 33 itself, and a movement of the combustor transition piece 33 is guided.

Figure 5:
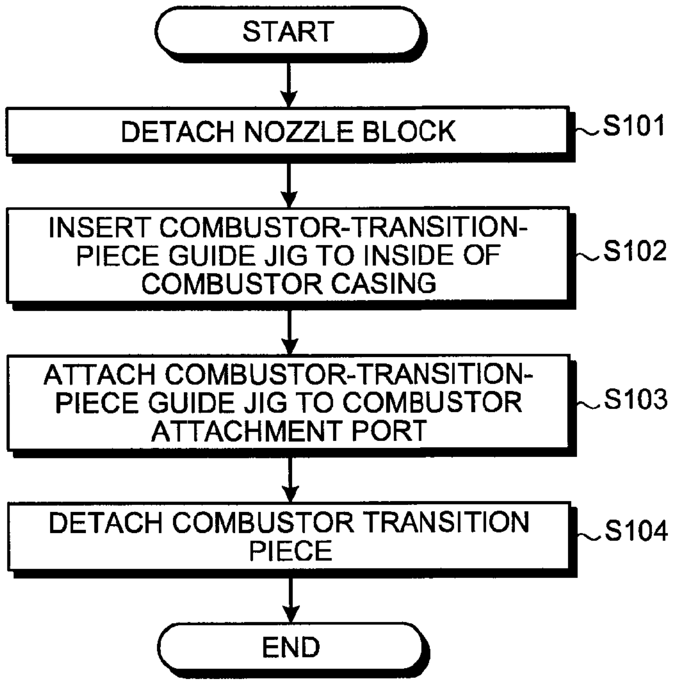
FIG. 5 is a flowchart of a procedure in a method of detaching a combustor of a gas turbine according to the embodiment.

FIG. 5 is a flowchart of a procedure in the method of detaching a combustor of a gas turbine according to the present embodiment. FIGS. 6 to 14 are explanatory diagrams of the procedure in the method of detaching a combustor of a gas turbine according to the present embodiment. The method of detaching a combustor of a gas turbine (hereinafter, "combustor detaching method") according to the present embodiment is performed by workers by using existing maintenance/inspection facilities installed in a plant or the like where the gas turbine 1 shown in FIG. 1 is installed.

Figure 6:
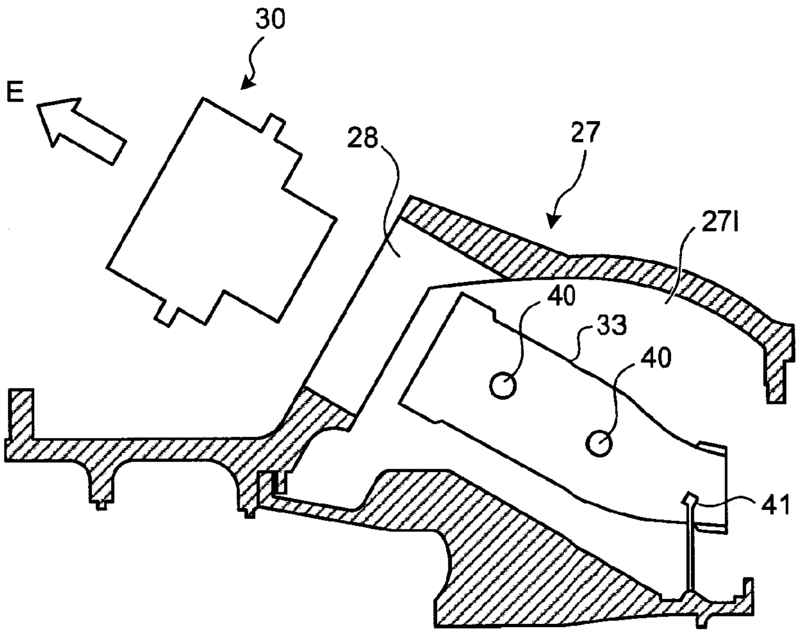
FIG. 6 is an explanatory diagram of a procedure of detaching a nozzle block in the method of detaching a combustor of a gas turbine according to the embodiment.

When the combustor detaching method is performed, at Step S101, as shown in FIG. 6, the nozzle block 30 is detached from the combustor casing 27. Because the nozzle block 30 includes the pilot nozzle 34 and the premix nozzle 35 that burn fuel together with air to generate the combustion gas, detachment of the nozzle block 30 from the combustor casing 27 means detachment of a nozzle that burns fuel together with air to generate the combustion gas from the combustor casing 27.

Figure 7:
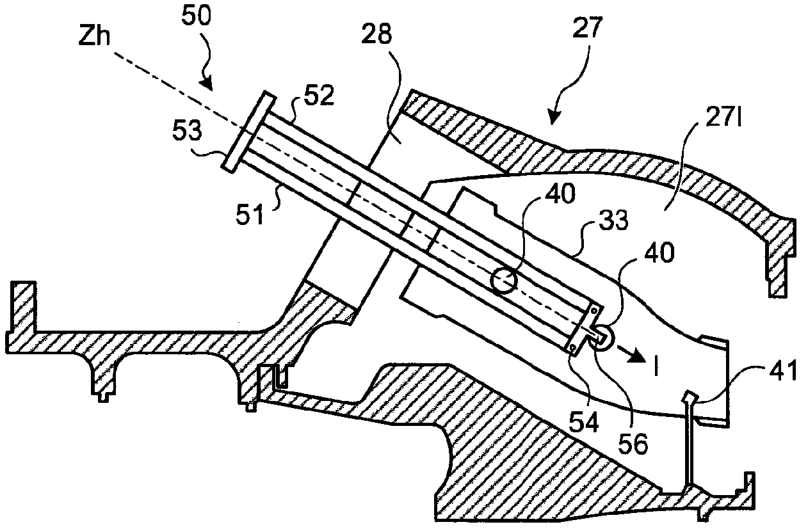
FIG. 7 is an explanatory diagram of a procedure of attaching a combustor-transition-piece guide jig in the method of detaching a combustor of a gas turbine according to the embodiment.

When the nozzle block 30 is detached from the combustor casing 27, control proceeds to Step S102, and as shown in FIG. 7, the combustor-transition-piece guide jig 50 is inserted from the combustor attachment port 28 formed in the combustor casing 27 toward the inside 27I of the combustor casing (in a direction shown by an arrow I in FIG. 7). The combustor attachment port 28 is provided for attaching the combustor 12 to the combustor casing 27.

Figure 8:
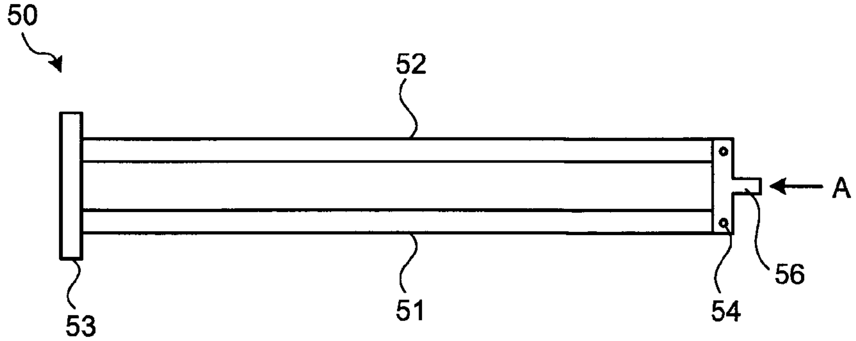
FIG. 8 is a front view of a combustor-transition-piece guide jig according to the embodiment.
Figure 9:
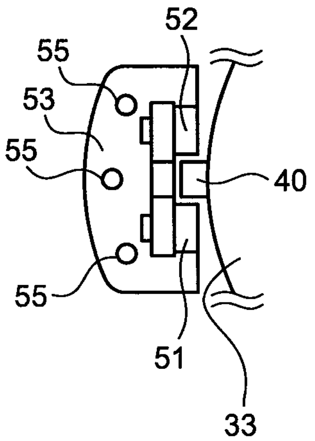
FIG. 9 is a side view of a fixing member of the combustor-transition-piece guide jig according to the embodiment.

As shown in FIGS. 8 and 9, the combustor-transition-piece guide jig 50 includes two rails 51 and 52, a fixing member 53 attached to one ends of the two rails 51 and 52, and a holding member 54 attached to other ends of the two rails 51 and 52 opposite to the ends attached to the fixing member 53, and on the same side of the two rails. FIG. 9 depicts the combustor-transition-piece guide jig 50 as viewed from a direction shown by an arrow A in FIG. 8. A combustor-casing side support 56 supported by the guide jig support 41 is formed on the holding member 54 on the opposite side of the fixing member 53.

The two rails 51 and 52 are attached to the fixing member 53 so that a longitudinal direction thereof is orthogonal to a plate surface of the fixing member 53. The fixing member 53 is a plate-like member, and fastened and fixed to the combustor attachment port 28, for example, by a bolt, thereby fixing the two rails 51 and 52 to the combustor attachment port 28. Further, the two rails 51 and 52 are supported by the guide jig support 41 in the inside 27I of the combustor casing by the holding member 54 attached to the ends thereof opposite to the ends attached to the fixing member 53. Thus, the combustor-transition-piece guide jig 50 is inserted into the inside of the combustor casing 27.

Figure 10A:
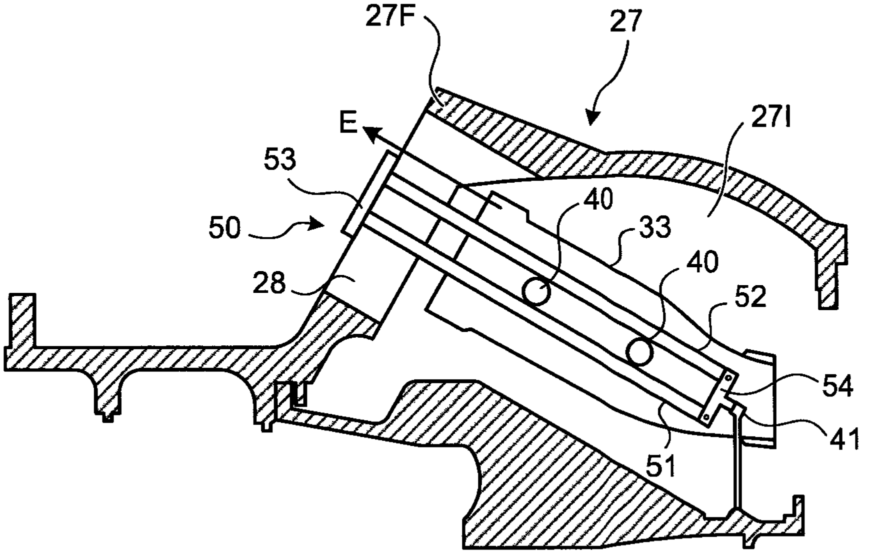
FIG. 10A is a partial cross-sectional view of inside of a combustor casing of the gas turbine according to the embodiment.
Figure 10B:
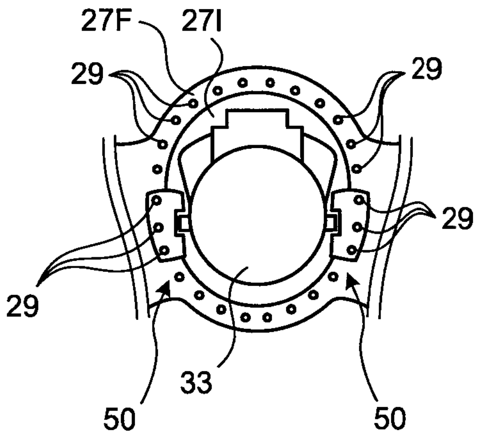
FIG. 10B is a front view of the combustor casing of the gas turbine according to the embodiment, as viewed from a combustor attachment port side.

The bolt is penetrated through a plurality of through holes 55 provided on the fixing member 53 shown in FIG. 9, to fix the fixing member 53 to the combustor attachment port 28 by using bolt holes 29 for combustor attachment provided in a combustor casing flange 27F shown in FIGS. 10A and 10B. The nozzle block 30 shown in FIG. 6 is fixed to the bolt holes 29 for combustor attachment by the bolts, to attach the combustor 12 to the combustor casing 27.

When the combustor-transition-piece guide jig 50 is inserted into the inside 271 of the combustor casing, as shown in FIGS. 10A and 10B, the two rails 51 and 52 constituting the combustor-transition-piece guide jig 50 are supported by the combustor attachment port 28 and the guide jig support 41 via the fixing member 53 and the holding member 54. Therefore, the combustor-transition-piece guide jig 50 is inserted into the inside 27I of the combustor casing, as shown in FIGS. 10-1 and 10-2, the two rails 51 and 52 constituting the combustor-transition-piece guide jig 50 are supported by the combustor attachment port 28 and the guide jig support 41 via the fixing member 53 and the holding member 54. Therefore, the combustor-transition-piece guide jig 50 is supported at two positions, that is, the combustor attachment port 28 and the guide jig support 41. Thus, by supporting the combustor-transition-piece guide jig 50 at two positions, when the combustor transition piece 33 is guided and moved by the combustor-transition-piece guide jig 50, deformation and deflection of the combustor-transition-piece guide jig 50 can be suppressed, and the combustor transition piece 33 can be reliably guided into the inside of the combustor casing 27.

As shown in FIG. 9, the combustor-transition-piece guiding part 40 provided on the outer circumference of the combustor transition piece 33 is put between the two rails 51 and 52 constituting the combustor-transition-piece guide jig 50. With this configuration, when the combustor transition piece 33 is detached from the combustor casing 27 or attaching the combustor transition piece 33 to the combustor casing 27, the combustor-transition-piece guiding part 40 comes into contact with at least one of the two rails 51 and 52, and moves along the two rails 51 and 52.

The two rails 51 and 52 are arranged with the longitudinal direction thereof (a moving direction of the combustor transition piece 33 at the time of detaching or attaching the combustor transition piece 33) being parallel with a penetration direction of the combustor attachment port 28 (that is, an axis Zh of the combustor attachment port 28). With this configuration, because the moving direction of the combustor transition piece 33 at the time of detaching or attaching the combustor transition piece 33 and the penetration direction of the combustor attachment port 28 become parallel with each other, an opening of the combustor attachment port 28 can be used efficiently when the combustor transition piece 33 passes through the combustor attachment port 28. For example, if the size of an external shape of the combustor transition piece 33 is the same, an opening area of the combustor attachment port 28 can be requisite minimum, and thus the combustor attachment port 28 does not need to be enlarged more than necessary, and the strength of the casing constituting the combustor casing can be easily ensured.

As shown in FIGS. 10A and 10B, the combustor transition piece 33 is supported by a pair of combustor-transition-piece guide jigs 50 arranged opposite to each other. Therefore, the combustor-transition-piece guiding part 40 is also provided in a pair opposite to the combustor transition piece 33. At least one combustor-transition-piece guide jig 50 needs only to be arranged in a mode for supporting the mass of the combustor transition piece 33, and the number and arrangement of the combustor-transition-piece guide jig 50 and the combustor-transition-piece guiding part 40 are not limited to the mode disclosed in the present embodiment. For example, the combustor transition piece 33 can be guided by one combustor-transition-piece guide jig 50, or by three or more combustor-transition-piece guide jigs 50. If a plurality of combustor-transition-piece guiding parts 40 are provided, a movement of the combustor transition piece 33 is stabilized at the time of attachment/detachment of the combustor transition piece 33. A stable movement of the combustor transition piece 33 can reduce a possibility of contact between the combustor transition piece 33 and other parts of the gas turbine in the inside 27I of the combustor casing.

The number of the rails constituting the combustor-transition-piece guide jig 50 is not limited to two, and can be arranged in such a mode that at least one rail supports the mass of the combustor transition piece 33. For example, the mode can be such that one rail constitutes the combustor-transition-piece guide jig 50, the combustor-transition-piece guide jig 50 is arranged on a vertical direction side of the combustor transition piece 33 (on an acting direction side of gravity), and one combustor-transition-piece guiding part 40 provided on the outer circumference of the combustor transition piece 33 is supported by the rail. Also in this case, because the mass of the combustor transition piece 33 can be received by the combustor-transition-piece guide jig 50, the load on workers can be reduced. In the present embodiment, the rails 51 and 52 are linear structures; however, for example, these can be curved structures according to a curved portion of the combustor transition piece 33.

At Step S102, when the combustor-transition-piece guide jig 50 is inserted toward the inside 27I of the combustor casing, control proceeds to Step S103. At Step S103, by attaching the fixing member 53 of the combustor-transition-piece guide jig 50 to the combustor attachment port 28, the combustor-transition-piece guide jig 50 is attached to the combustor attachment port 28.

Figure 13:
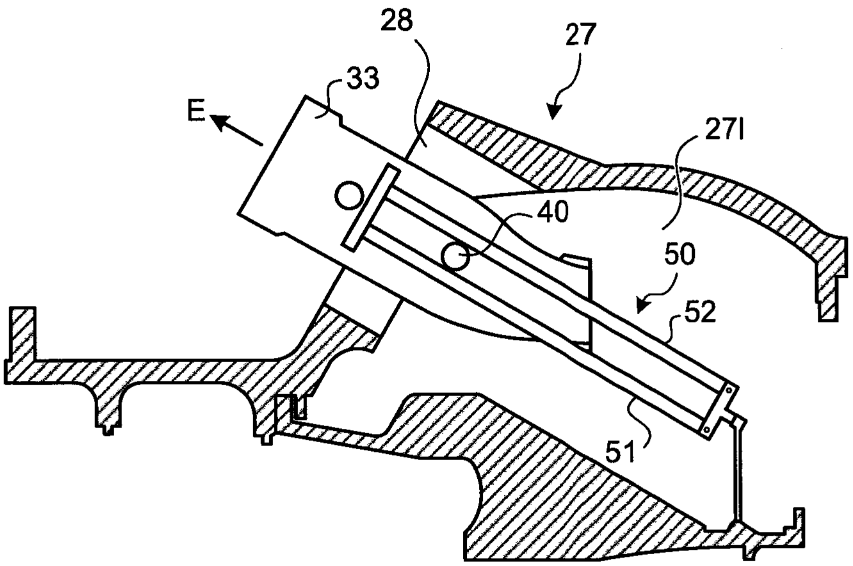
FIG. 13 is an explanatory diagram of a procedure of detaching a combustor transition piece in the method of detaching a combustor of a gas turbine according to the embodiment.

Control proceeds to Step S104, and as shown in FIGS. 10A and 13, the combustor transition piece 33 is moved in a direction away from the inside 27I of the combustor casing (a direction indicated by an arrow E in FIGS. 10A and 13), and the combustor transition piece 33 is detached from the combustor casing 27. At this time, the combustor-transition-piece guiding part 40 provided on the combustor transition piece 33 comes into contact with at least one of the two rails 51 and 52 constituting the combustor-transition-piece guide jig 50, and engages therewith. With this configuration, as shown in FIG. 13, the combustor transition piece 33 is supported by at least one of the two rails 51 and 52 constituting the combustor-transition-piece guide jig 50, and moves along the two rails 51 and 52.

As described above, at the time of detaching the combustor transition piece 33 from the combustor casing 27, because a part of the mass of the combustor transition piece 33 is supported by the combustor-transition-piece guide jig 50, the labor of workers at the time of moving the combustor transition piece 33 from the inside 27I of the combustor casing is considerably reduced. Particularly, because the mass of the combustor transition piece 33 becomes about 100 kilograms, a reduction effect of the labor of workers by using the combustor-transition-piece guide jig 50 is remarkable.

Further, because a gap between the combustor attachment port 28 and the combustor transition piece 33 shown in FIG. 10A is limited, the both may come into contact with each other at the time of detaching the combustor transition piece 33 from the combustor casing 27. In the present embodiment; however, because the moving direction of the combustor transition piece 33 is defined in one direction (in the penetration direction of the combustor attachment port 28 according to the present embodiment) by the combustor-transition-piece guide jig 50, the possibility of contact between the combustor transition piece 33 and the combustor attachment port 28 can be avoided. With this configuration, the contact between the combustor transition piece 33 and the combustor attachment port 28 can be avoided only by pulling out the combustor transition piece 33 from the inside 27I of the combustor casing, and thus workers do not need to pay attention to the contact between these. As a result, the load on workers can be further reduced.

Figure 11:
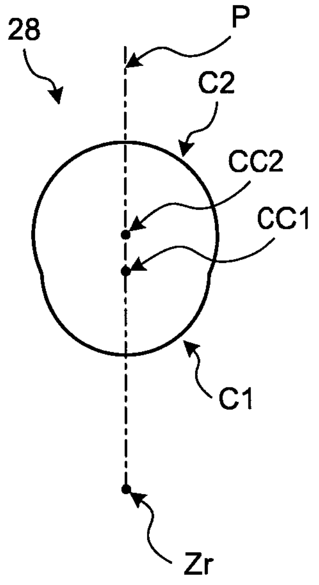
FIG. 11 depicts an opening shape of a combustor attachment port of the combustor of the gas turbine according to the embodiment.

Because the combustor transition piece 33 includes a curved portion to be connected to the turbine 13 shown in FIG. 1, when the combustor transition piece 33 is detached from the combustor casing 27, an interference between the combustor attachment port 28 and the combustor transition piece 33 needs to be avoided. In the present embodiment, as shown in FIG. 11, the combustor attachment port 28 has such a shape that different circles C1 and C2 respectively having a center CC1 and a center CC2 different from each other are overlapped on each other. The centers CC1 and CC2 are present on a plane P including a rotation axis Zr of the turbine 13 and the compressor 11 of the gas turbine 1, and on an attachment plane of the nozzle block (see FIG. 2) to the combustor casing flange 27F (see FIG. 11). Further, diameters of the circles C1 and C2 can be the same or different.

Consequently, the interference between the combustor attachment port 28 and the combustor transition piece 33 can be avoided. Further, the combustor attachment port 28 is provided in a plurality of numbers toward a circumferential direction of the combustor casing 27. By having such a configuration, a gap between the adjacent combustor attachment ports 28 can be ensured, and a stress generated between the adjacent combustor attachment ports 28 can be reduced. Further, because the combustor attachment port 28 has a shape in which different circles C1 and C2 having the centers CC1 and CC2 different from each other are overlapped on each other, if two holes are bored by a boring tool, designating CC1 and CC2 as boring centers, the combustor attachment port 28 can be easily formed without using an end mill.

Figure 12:
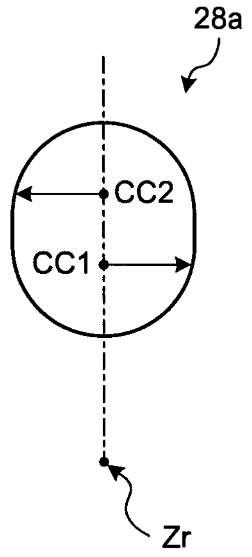
FIG. 12 depicts an opening shape of the combustor attachment port of the combustor of the gas turbine according to the embodiment.

The shape of a combustor attachment port 28*a* shown in FIG. 12 is a shape of a racetrack, that is, a shape in which two semicircular arcs are connected by two straight lines. In this case, centers of the respective semicircular arcs are CC1 and CC2. The centers CC1 and CC2 are present on the plane P including a rotation axis Zr of the turbine 13 and the compressor 11 of the gas turbine 1, and on the attachment plane of the nozzle block (see FIG. 2) to the combustor casing flange 27F (see FIG. 12). By having such a configuration, the same action and effect as those when the shape of the combustor attachment port 28 is such that different circles C1 and C2 having the center CC1 and the center CC2 different from each other are overlapped on each other can be obtained. The shape of the combustor attachment port 28 is not limited to the shapes described above, and can be a polygonal shape such as elliptic, square, hexagonal, or octagonal. The combustor attachment port 28 needs only to be formed in an opening that is long in a radial direction, centering on the rotation shaft Zr, and short in a circumferential direction.

Figure 14:
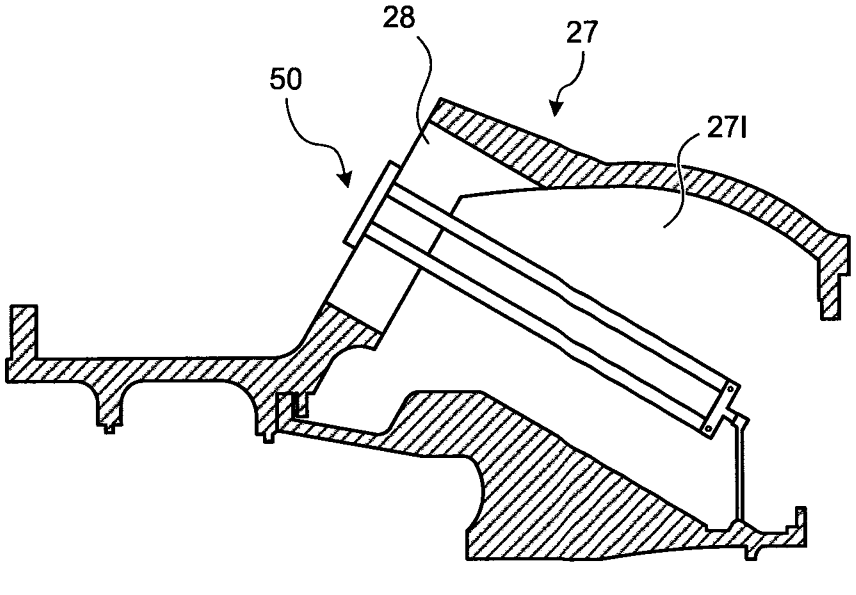
FIG. 14 depicts a state where the combustor transition piece is detached in the method of detaching a combustor of a gas turbine according to the embodiment.

As shown in FIG. 14, when the combustor transition piece 33 is detached from the combustor casing 27, the combustor-transition-piece guide jig 50 is left in the inside 27I of the combustor casing. A method of attaching a combustor of a gas turbine according to the present embodiment is explained next.

Figure 15:
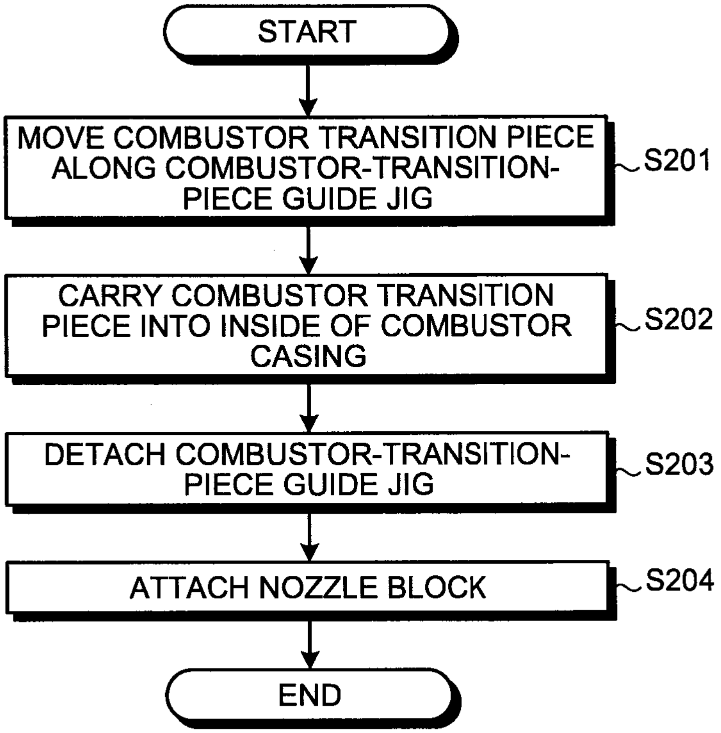
FIG. 15 is a flowchart of a procedure in a method of attaching a combustor of a gas turbine according to the embodiment.

FIG. 15 is a flowchart of a procedure in a method of attaching a combustor of a gas turbine according to the present embodiment. FIGS. 16 to 20 are explanatory diagrams of the procedure in the method of attaching a combustor of a gas turbine according to the present embodiment. The method of attaching a combustor of a gas turbine (hereinafter, "combustor attaching method") according to the present embodiment is performed by workers by using existing maintenance/inspection facilities installed in a plant or the like where the gas turbine 1 shown in FIG. 1 is installed.

Figure 16:
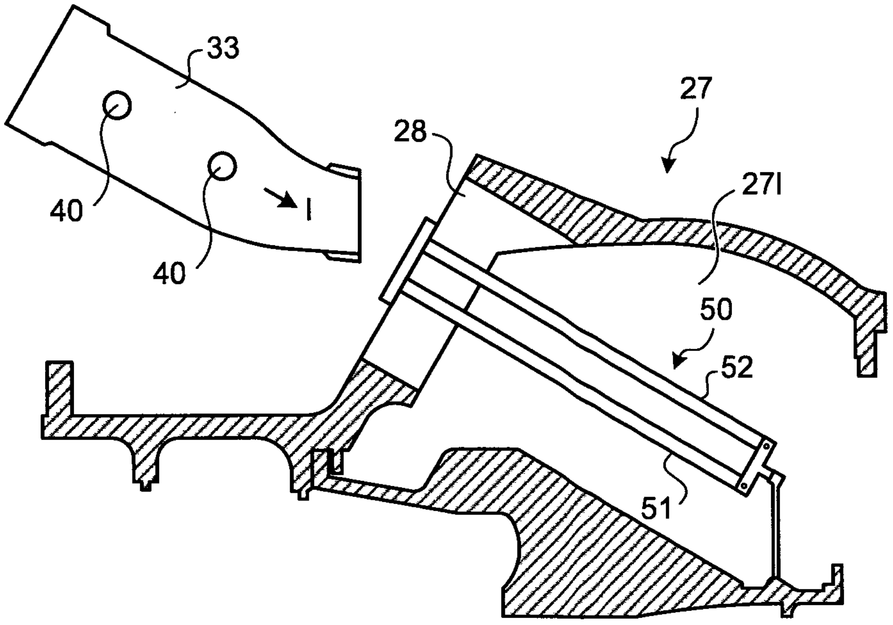
FIG. 16 depicts a state before the combustor transition piece is attached in the method of attaching a combustor of a gas turbine according to the embodiment.

When the combustor attaching method is performed, as shown in FIG. 14, the combustor-transition-piece guide jig 50 is in a state of being attached to the combustor attachment port 28 of the combustor casing 27. When the combustor attaching method is performed, at Step S201, as shown in FIG. 16, the combustor-transition-piece guiding part 40 provided in the combustor transition piece 33 is inserted into between the two rails 51 and 52 constituting the combustor-transition-piece guide jig 50, so that the combustor transition piece 33 is inserted into the combustor-transition-piece guide jig 50. At this time, the combustor transition piece 33 is moved in a direction shown by an arrow I shown in FIG. 16, that is, toward the combustor attachment port 28.

Figure 17:
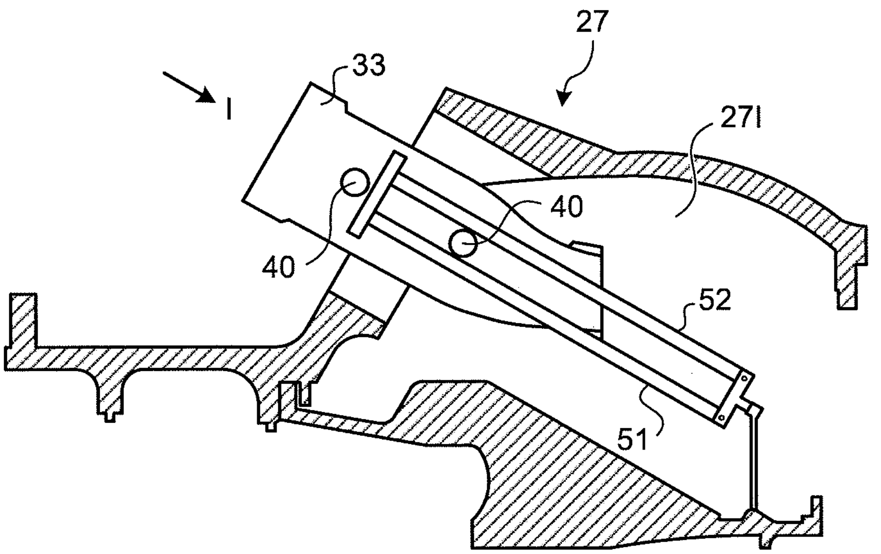
FIG. 17 is an explanatory diagram of a procedure of carrying the combustor transition piece into a casing in the method of attaching a combustor of a gas turbine according to the embodiment.

As shown in FIG. 17, control proceeds to Step S202 where the combustor transition piece 33 is carried into the inside 27I of the combustor casing along the combustor-transition-piece guide jig 50. As shown in FIG. 17, the combustor-transition-piece guiding part 40 provided on the outer circumference of the combustor transition piece 33 is then sandwiched between the two rails 51 and 52 constituting the combustor-transition-piece guide jig 50.

With this configuration, the combustor-transition-piece guiding part 40 provided in the combustor transition piece 33 comes into contact with at least one of the two rails 51 and 52 constituting the combustor-transition-piece guide jig 50, and engages therewith. Consequently, as shown in FIG. 17, the combustor transition piece 33 is supported by at least one of the two rails 51 and 52 constituting the combustor-transition-piece guide jig 50 via the combustor-transition-piece guiding part 40 during its movement, and moves along the two rails 51 and 52.

In this way, when the combustor transition piece 33 is attached to the combustor casing 27, because a part of the mass of the combustor transition piece 33 is supported by the combustor-transition-piece guide jig 50, the labor of workers at the time of moving the combustor transition piece 33 to the inside 27I of the combustor casing is considerably reduced. Further, because the moving direction of the combustor transition piece 33 is defined in one direction (in the penetration direction of the combustor attachment port 28 according to the present embodiment) by the combustor-transition-piece guide jig 50, the possibility of contact between the combustor transition piece 33 and the combustor attachment port 28 can be avoided. With this configuration, the contact between the combustor transition piece 33 and the combustor attachment port 28 can be avoided only by carrying the combustor transition piece 33 to the inside 27I of the combustor casing, and thus workers do not need to pay attention to the contact between these. As a result, the load on workers can be further reduced.

Figure 18:
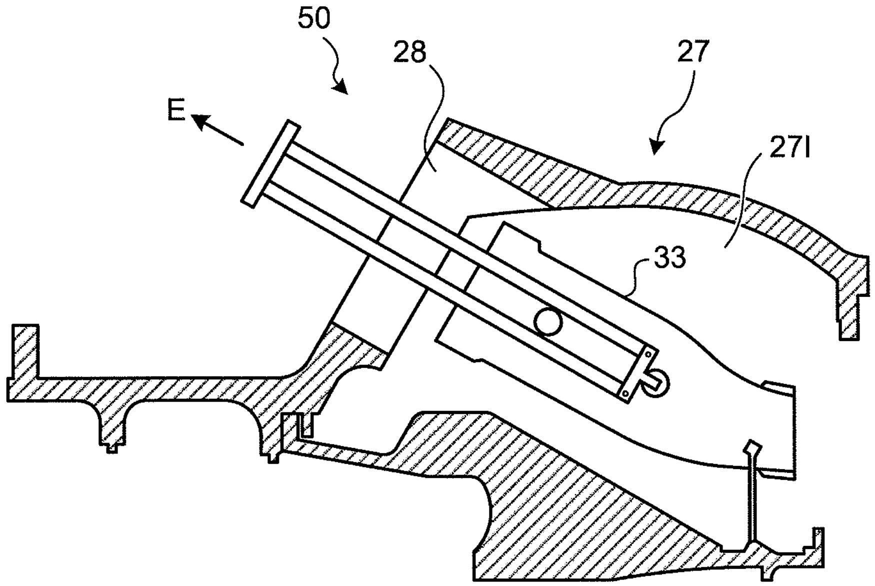
FIG. 18 is an explanatory diagram of a procedure of detaching the combustor-transition-piece guide jig in the method of attaching a combustor of a gas turbine according to the embodiment.

When the combustor transition piece 33 is carried to the inside 27I of the combustor casing and arranged at a specified position, the combustor transition piece 33 is fixed to a transition-piece fixing unit in the inside 27I of the combustor casing. Thereafter, control proceeds to Step S203, and as shown in FIG. 18, the combustor-transition-piece guide jig 50 is detached from the combustor casing 27. At this time, the combustor-transition-piece guide jig 50 is pulled out in a direction away from the combustor attachment port 28 (a direction shown by an arrow E in FIG. 18), and extracted from the inside 27I of the combustor casing.

Figure 19:
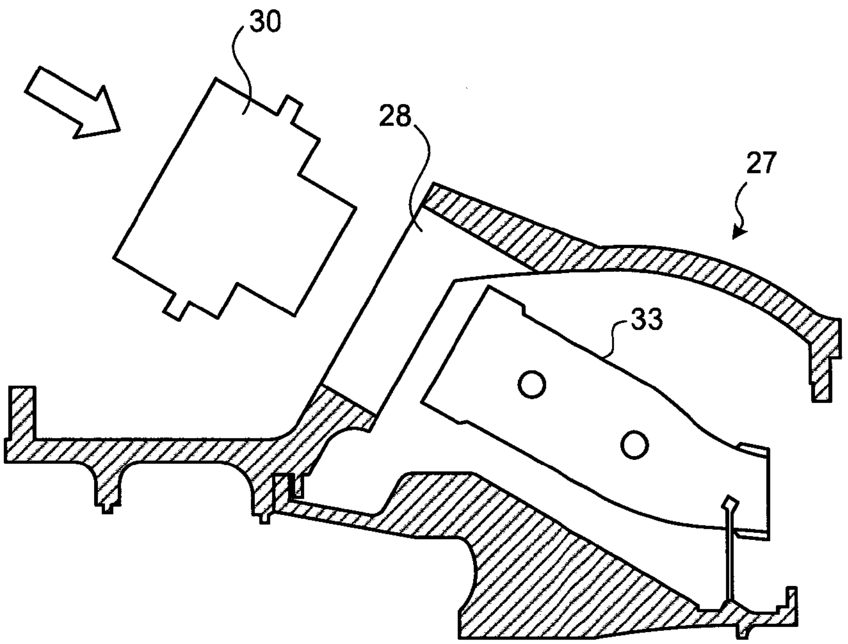
FIG. 19 is an explanatory diagram of a procedure of attaching the nozzle block in the method of attaching a combustor of a gas turbine according to the embodiment.
Figure 20:
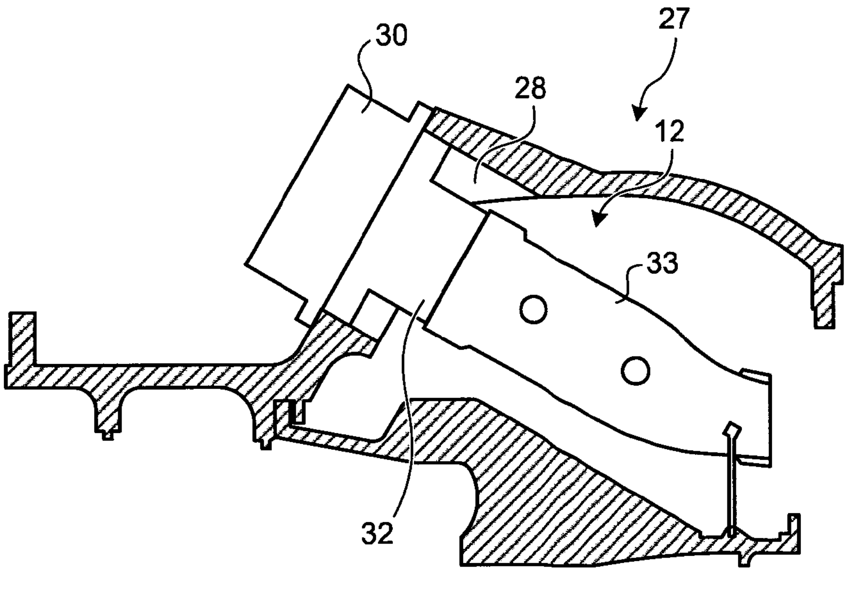
FIG. 20 depicts a state after the nozzle block is attached in the method of attaching a combustor of a gas turbine according to the embodiment.

Next, as shown in FIG. 19, control proceeds to Step S204 and the nozzle block 30 is attached to the combustor attachment port 28 of the combustor casing 27. At this time, as shown in FIG. 20, an end of the combustor inner cylinder 32 constituting the nozzle block 30 is inserted into the combustor transition piece 33. With this configuration, the combustor 12 is attached to the combustor casing 27.

In the present embodiment, the combustor-transition-piece guiding part provided on the combustor transition piece is supported by the rails attached to the combustor casing. With this configuration, a large-scale exchanging facility is not required at the time of detaching or attaching the combustor from or to the gas turbine. Further, because the combustor transition piece is supported by the rails via the combustor-transition-piece guiding part, a force at the time of moving the combustor transition piece from the combustor casing or at the time of moving the combustor transition piece to the combustor casing is reduced. As a result, at least at the time of detaching the combustor from the gas turbine or at the time of attaching the combustor to the gas turbine, the load on workers can be reduced due to a simple configuration. Furthermore, because the load on workers is reduced, the time required for detaching or attaching the combustor can be reduced. Therefore, the time required for maintenance and inspection of the gas turbine can be reduced and a down time of the gas turbine can be reduced.

INDUSTRIAL APPLICABILITY

The combustor-transition-piece guide jig, the method of detaching a combustor of a gas turbine, and the method of attaching a combustor of a gas turbine according to the present invention are useful at the time of detaching or attaching a combustor of a gas turbine from or to the gas turbine, and are particularly suitable for reducing workload at the time of moving a combustor transition piece.

The invention claimed is:

1. A combustor-transition-piece guide jig to be used at a time of attaching to the gas turbine or detaching from the gas turbine a combustor including a nozzle block that burns fuel together with air to generate combustion gas and a combustor transition piece that connects the nozzle block with a turbine of a gas turbine to guide the combustion gas to the turbine, the combustor-transition-piece guide jig comprising:

a rail configured to be inserted from a combustor attachment port formed in a combustor casing of the gas turbine for attaching the combustor toward an inside of the combustor casing, configured to come into contact with a combustor-transition-piece guiding part provided on the combustor transition piece, and guide the combustor transition piece; and a fixing member that is provided at one end of the rail, is configured to be attached to the combustor attachment port, and configured to fix the rail to the combustor attachment port.

2. A method, comprising:

obtaining access to the combustor-transition-piece guide jig of claim 1; and detaching the nozzle block from the combustor casing;

inserting the combustor-transition-piece guide jig from a combustor attachment port formed in the combustor casing toward an inside of the combustor casing;

attaching the combustor-transition-piece guide jig to the combustor attachment port; and extracting the combustor transition piece from the combustor attachment port, while causing the combustor-transition-piece guiding part to engage with the combustor-transition-piece guide jig to move along the combustor-transition-piece guide jig.

3. A method, comprising:

obtaining access to the combustor-transition-piece guide jig of claim 1; and bringing the combustor-transition-piece guiding part into contact with the combustor-transition-piece guide jig while it is attached to the combustor attachment port;

carrying the combustor transition piece from the combustor attachment port to inside of the combustor casing, while moving the combustor-transition-piece guiding part along the combustor-transition-piece guide jig;

detaching the combustor-transition-piece guide jig from the combustor attachment port; and attaching the nozzle block to the combustor attachment port.

4. The combustor-transition-piece guide jig according to claim 1, wherein the rail is parallel with a penetration direction of the combustor attachment port.

5. A method, comprising:

obtaining access to the combustor-transition-piece guide jig of claim 4; and detaching the nozzle block from the combustor casing;

inserting the combustor-transition-piece guide jig from a combustor attachment port formed in the combustor casing toward an inside of the combustor casing;

attaching the combustor-transition-piece guide jig to the combustor attachment port; and extracting the combustor transition piece from the combustor attachment port, while causing the combustor-transition-piece guiding part to engage with the combustor-transition-piece guide jig to move along the combustor-transition-piece guide jig.

6. A method, comprising:

obtaining access to the combustor-transition-piece guide jig of claim 4; and bringing the combustor-transition-piece guiding part into contact with the combustor-transition-piece guide jig while it is attached to the combustor attachment port;

carrying the combustor transition piece from the combustor attachment port to inside of the combustor casing, while moving the combustor-transition-piece guiding part along the combustor-transition-piece guide jig;

detaching the combustor-transition-piece guide jig from the combustor attachment port; and attaching the nozzle block to the combustor attachment port.

7. A method of detaching a combustor of a gas turbine, at a time of detaching a combustor that includes a nozzle block that burns fuel together with air to generate combustion gas and a combustor transition piece that connects the nozzle block with a turbine of a gas turbine to guide the combustion gas to the turbine, and is attached to a combustor casing of the gas turbine, the method comprising:

a step of detaching the nozzle block from the combustor casing;

a step of inserting a combustor-transition-piece guide jig for guiding the combustor transition piece from a combustor attachment port formed in the combustor casing for attaching the combustor toward an inside of the combustor casing;

a step of attaching the combustor-transition-piece guide jig to the combustor attachment port; and a step of extracting the combustor transition piece from the combustor attachment port, while causing a combustor-transition-piece guiding part provided on the combustor transition piece to engage with the combustor-transition-piece guide jig to move along the combustor-transition-piece guide jig.

8. A method of attaching a combustor of a gas turbine, at a time of attaching a combustor including a nozzle block that burns fuel together with air to generate combustion gas and a combustor transition piece that connects the nozzle block with a turbine of a gas turbine to guide the combustion gas to the turbine to the gas turbine, the method comprising:

a step of bringing a combustor-transition-piece guiding part provided on the combustor transition piece to engage with the combustor-transition-piece guide jig into contact with a combustor-transition-piece guide jig that guides the combustor transition piece, which is attached to a combustor attachment port formed in a combustor casing of the gas turbine for attaching the combustor;

a step of carrying the combustor transition piece from the combustor attachment port to inside of the combustor casing, while moving the combustor-transition-piece guiding part along the combustor-transition-piece guide jig;

a step of detaching the combustor-transition-piece guide jig from the combustor attachment port; and a step of attaching the nozzle block to the combustor attachment port.

* * * * *